US012665847B2

(12) United States Patent
Yan et al.

(10) Patent No.: US 12,665,847 B2
(45) Date of Patent: Jun. 23, 2026

(54) ADDRESSING METHOD, ADDRESSING SYSTEM, AND ADDRESSING APPARATUS

(71) Applicant: HUAWEI TECHNOLOGIES CO., LTD., Shenzhen (CN)

(72) Inventors: Zhefeng Yan, Shenzhen (CN); Huimin Zhang, Shenzhen (CN); Chang Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1084 days.

(21) Appl. No.: 17/738,060

(22) Filed: May 6, 2022

(65) Prior Publication Data

US 2022/0263759 A1 Aug. 18, 2022

Related U.S. Application Data

(63) Continuation of application No. PCT/CN2019/116262, filed on Nov. 7, 2019.

(51) Int. Cl.
*H04L 45/7453* (2022.01)
*H04L 67/1097* (2022.01)

(52) U.S. Cl.
CPC ...... *H04L 45/7453* (2013.01); *H04L 67/1097* (2013.01)

(58) Field of Classification Search
None
See application file for complete search history.

(56) References Cited

U.S. PATENT DOCUMENTS 9,990,176 B1 * 6/2018 Gray ..................... G06F 16/957
2007/0283043 A1 12/2007 Kiyohara et al.
(Continued)

FOREIGN PATENT DOCUMENTS

CN 101399743 A 4/2009
CN 101510897 A 8/2009
(Continued)

OTHER PUBLICATIONS

Hong Li, Chenghui Peng, Bojie Li, Yuhua Chen, Wei Zhang, Jianjun Wu, and Hua Huang, User ID Routing Architecture, pp. 1-8, Mar. 2010.*
(Continued)

*Primary Examiner* — Christopher M Crutchfield
(74) *Attorney, Agent, or Firm* — Maier & Maier, PLLC

(57) ABSTRACT

An addressing method, an addressing system, and an addressing apparatus are provided. The addressing method includes: a requesting node obtains routing information of a distributed storage network, where the distributed storage network includes one or more fixed nodes, the routing information includes one or more content identifiers, a communication address corresponding to the content identifier, and a user identifier corresponding to the content identifier, and a communication address of a mobile node corresponding to the user identifier in the routing information is a preset field; the requesting node obtains, based on the routing information, a target communication address corresponding to a target content identifier in the one or more content identifiers; and the requesting node obtains target content based on the target communication address.

23 Claims, 4 Drawing Sheets

(56) References Cited

U.S. PATENT DOCUMENTS

| | | | |
|---|---|---|---|
| 2008/0244067 A1 | 10/2008 | Ushiyama | |
| 2009/0037445 A1* | 2/2009 | Ushiyama | H04L 67/1059 |
| 2010/0145925 A1* | 6/2010 | Flinta | H04L 61/45 |
| | | | 707/E17.108 |
| 2012/0072528 A1* | 3/2012 | Rimac | H04N 21/64738 |
| | | | 709/217 |
| 2012/0222080 A1 | 8/2012 | Inoue | |
| 2013/0198332 A1 | 8/2013 | Van Ackere et al. | |
| 2014/0258462 A1* | 9/2014 | Hwang | G06Q 50/01 |
| | | | 709/219 |
| 2017/0286558 A1* | 10/2017 | Kelleher | G06F 11/323 |

FOREIGN PATENT DOCUMENTS

| | | |
|---|---|---|
| CN | 102170456 A | 8/2011 |
| CN | 102664938 A | 9/2012 |
| CN | 103107944 A | 5/2013 |
| EP | 2530899 A1 | 12/2012 |
| WO | WO-0167689 A1 * | 9/2001 ......... H04L 61/5084 |
| WO | 2010033732 A1 | 3/2010 |

OTHER PUBLICATIONS

Nahla Abid, Philippe Bertin, Cesson Sévigné, and Jean-Marie Bonnin, SANA: A Service-Aware Naming Architecture for Future Internet, pp. 1-6 (Year: 2011).*

Raed Al-Aaridhi and Kalman Graffi, Sets, Lists and Trees: Distributed Data Structures on Distributed Hash Tables, pp. 1-8 (Year: 2016).*

Yu et al., "A DHT-based hierarchical overlay for Peer-to-Peer MMOGs over MANETs", 2011 7th International Wireless Communications and Mobile Computing Conference, Jul. 4-8, 2011, 6 pages.

Alfoudi et al., "Seamless Mobility Management in Heterogeneous 5G Networks: A Coordination Approach among Distributed SDN Controllers", 2019 IEEE 89th Vehicular Technology Conference (VTC2019-Spring), Apr. 28, 2019-May 1, 2019, 6 pages.

* cited by examiner

100

200

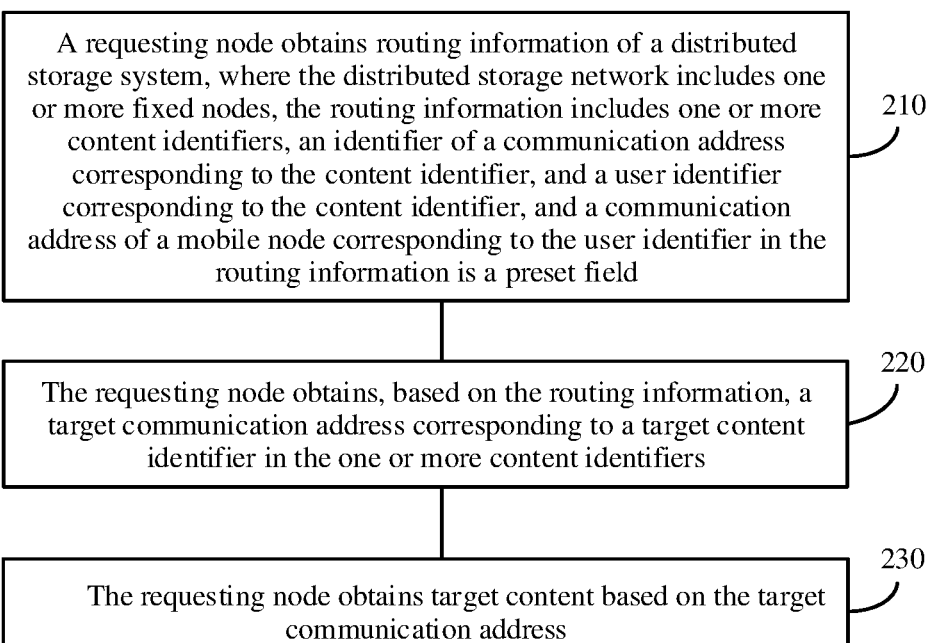

A requesting node obtains routing information of a distributed storage system, where the distributed storage network includes one or more fixed nodes, the routing information includes one or more content identifiers, an identifier of a communication address corresponding to the content identifier, and a user identifier corresponding to the content identifier, and a communication address of a mobile node corresponding to the user identifier in the routing information is a preset field        210

The requesting node obtains, based on the routing information, a target communication address corresponding to a target content identifier in the one or more content identifiers        220

The requesting node obtains target content based on the target communication address        230

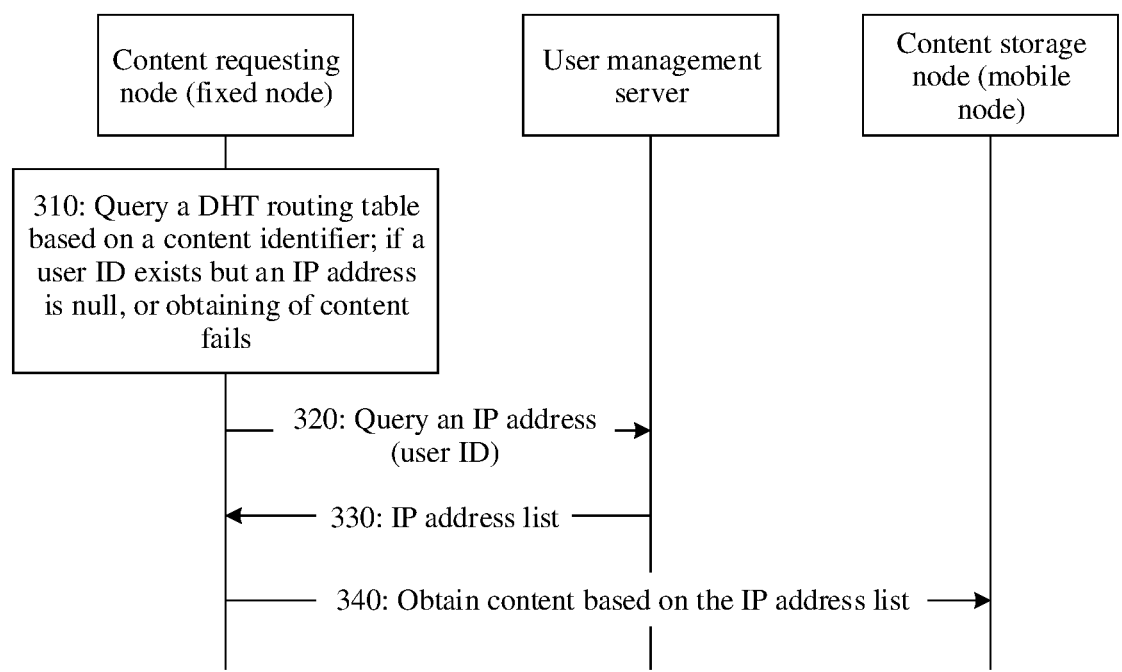

Content requesting node (fixed node)

User management server

Content storage node (mobile node)

310: Query a DHT routing table based on a content identifier; if a user ID exists but an IP address is null, or obtaining of content fails 320: Query an IP address (user ID)

330: IP address list

340: Obtain content based on the IP address list

FIG. 3

ADDRESSING METHOD, ADDRESSING SYSTEM, AND ADDRESSING APPARATUS

CROSS-REFERENCE TO RELATED APPLICATIONS

This application is a continuation of International Application No. PCT/CN2019/116262, filed on Nov. 7, 2019, the disclosure of which is hereby incorporated by reference in its entirety.

TECHNICAL FIELD

The embodiments relate to the field of information technologies, an addressing method, an addressing system, and an addressing apparatus.

BACKGROUND

With the development of the internet era, the scale of problems to be handled becomes larger, and consequently, a capacity of a single node cannot meet the demand. The capacity may refer to a computing resource (for example, a memory), a storage resource (for example, a hard drive), or a network resource (for example, a network input/output). Therefore, a distributed storage system is provided. A service is provided by coordinating a plurality of terminals to work together to meet the demand for capacity.

Currently, addressing in the distributed storage system may be implemented by using a distributed hash table (DHT) technology. The DHT technology may use routing at an overlay, and a network constructed by using the DHT technology may have a ring topology. In the ring topology, each node may have a unique node identifier. Each node stores, in routing information, information about identifiers and addresses of an in-order precursor node and an in-order successor node that are connected to the node. Other nodes can be found conveniently based on information in the routing information. The search effect is good.

However, with the rapid development of the mobile internet, address information of a mobile terminal may frequently change with changes of an access manner. When address information of any node in the distributed storage system changes, DHT routing information and node identifier information frequently change correspondingly. This results in large signaling overheads of a terminal device in an addressing process. Therefore, when an address of a mobile node frequently changes, how to reduce signaling overheads of the terminal device in the addressing process becomes an urgent problem to be resolved.

SUMMARY

An addressing method, an addressing system, and an addressing apparatus may reduce a quantity of times of updating routing information and reduce network overheads when an address of a mobile node frequently changes.

According to a first aspect, an addressing method is provided. The addressing method includes: A requesting node obtains routing information of a distributed storage network, where the distributed storage network includes one or more fixed nodes, the routing information includes one or more content identifiers, a communication address corresponding to the content identifier, and a user identifier corresponding to the content identifier, and a communication address of a mobile node corresponding to the user identifier in the routing information is a preset field; the requesting node obtains, based on the routing information, a target communication address corresponding to a target content identifier in the one or more content identifiers; and the requesting node obtains target content based on the target communication address.

In a possible implementation, the communication address may be an internet protocol IP address.

It should be understood that the communication address corresponding to the content identifier is a communication address of a node that stores content corresponding to the content identifier. The user identifier corresponding to the content identifier is a user identifier of a user to which the node storing the content corresponding to the content identifier belongs.

It should be further understood that, that a communication address is a preset field means that when the communication address of the mobile node is updated, the communication address of the mobile node in the routing information remains unchanged. For example, the communication address of the mobile node is a null entry in the routing information or is a preset field that indicates that the communication address is a communication address of a mobile node.

The content identifier may alternatively be an identifier of the node storing the content.

In this embodiment, the requesting node may perform addressing of the target content based on triplet routing information, namely, the routing information that includes the content identifier, the communication address corresponding to the content identifier, and the user identifier corresponding to the content identifier, to obtain the target content. In the triplet routing information, the communication address that is of the mobile node corresponding to the user identifier and that is stored in the routing information may be the preset field, in other words, the communication address of the mobile node included in the routing information is not updated with changes of the communication address of the mobile node. Therefore, frequent changes of the routing information of the distributed storage network caused by frequent changes of the communication address of the mobile node are reduced, and network overheads are reduced.

With reference to the first aspect, in some implementations of the first aspect, that the requesting node obtains, based on the routing information, a target communication address corresponding to a target content identifier in the one or more content identifiers includes: The requesting node obtains, based on the target content identifier and the routing information, a target user identifier corresponding to the target content identifier; and the requesting node obtains, based on the target user identifier, a communication address of a mobile node corresponding to the target user identifier.

For example, one user identifier (for example, a user ID) may be registered for one user, and the user may log in to the user identifier on a plurality of terminal devices, so that stored content of the plurality of terminal devices of the user can be synchronized and shared.

For example, the mobile node corresponding to the user identifier may be a terminal device such as a smartphone, a tablet, or a portable computer. A fixed node corresponding to the user identifier may be a terminal device such as a desktop computer, a smart television, network attached storage, or a smart home device gateway.

In a possible implementation, the requesting node may query the routing information based on the target content identifier. If it is found that the communication address corresponding to the target content identifier is a preset field, it indicates that the target content corresponding to the target content identifier is stored on the mobile node. In this case, the requesting node may find, based on the target content identifier, the target user identifier corresponding to the target content identifier, and may obtain, based on the target user identifier, information about the mobile node corresponding to the target user identifier. Further, the requesting node may access the communication address of the mobile node until the target content is obtained.

In a possible implementation, the requesting node may query the routing information based on the target content identifier, find the communication address corresponding to the target content identifier, and access the communication address, but fail to obtain the target content. In this case, the requesting node may find, based on the target content identifier, the target user identifier corresponding to the target content identifier, and may obtain, based on the target user identifier, communication addresses of the mobile node and the fixed node that correspond to the target user identifier, and access the mobile node and the fixed node until the target content is obtained.

In this embodiment, when obtaining of the target content based on the routing information fails or the communication address of the current mobile node cannot be obtained, the requesting node may obtain the target user identifier corresponding to the target content identifier, and then obtain the information about the mobile node and/or the fixed node based on the target user identifier, to obtain the target content.

With reference to the first aspect, in some implementations of the first aspect, that the requesting node obtains, based on the target user identifier, a communication address of a mobile node corresponding to the target user identifier includes: The requesting node sends a query instruction to a user management server, where the query instruction includes the target user identifier, and the user management server is configured to manage information about a mobile node and a fixed node that belong to the user identifier; and the requesting node receives a communication address list sent by the user management server, where the communication address list includes the communication address of the mobile node corresponding to the target user identifier.

The user management server may be configured to maintain and manage user identifiers and device information of different users. Device information may include information about all fixed nodes and mobile nodes that belong to an identifier of a user, for example, IP address information and a node type (a mobile node or a fixed node) of a device that belongs to the user.

In this embodiment, the requesting node may query information about the communication address of the mobile node or the fixed node from the user management server based on the target user identifier queried from the routing information. In this way, when the communication address of the mobile node is frequently updated, the routing information in the distributed storage network does not need to be updated for a plurality of times. This reduces network overheads.

With reference to the first aspect, in some implementations of the first aspect, the requesting node is a fixed node, and that a requesting node obtains routing information of a distributed storage network includes: The requesting node sends a routing information query instruction, where the routing information query instruction includes the target content identifier; or the requesting node determines, based on the target content identifier and by using a distributed hash algorithm, information about a fixed node that stores the routing information, and the requesting node obtains the routing information from the fixed node that stores the routing information.

In a possible implementation, the requesting node may obtain, through preconfiguration, domain name resolution, hypertext transfer protocol redirection, or the like, information about the fixed node that stores the routing information, access the fixed node, and query the routing information.

With reference to the first aspect, in some implementations of the first aspect, the requesting node is a mobile node, and that a requesting node obtains routing information of a distributed storage network includes: The requesting node obtains information about a first fixed node from the user management server, where the first fixed node and the requesting node correspond to a same user identifier; the requesting node sends a routing information query instruction to the first fixed node, where the routing information query instruction includes the target content identifier; and the requesting node obtains the routing information from the first fixed node.

In this embodiment, the requesting node may be a mobile node in a system. When the requesting node is a mobile node, the requesting node may not be deployed on a DHT ring. Therefore, the requesting node cannot directly access the routing information in the distributed storage network. In this case, the requesting node may obtain the routing information from a fixed node that belongs to the same user ID as the requesting node, and the fixed node forwards the routing information to the requesting node.

With reference to the first aspect, in some implementations of the first aspect, that the requesting node obtains target content based on the target communication address includes: The requesting node determines a second fixed node based on the user identifier corresponding to the requesting node; and the requesting node obtains the target content from the second fixed node, where the second fixed node and the requesting node correspond to the same user identifier.

In this embodiment, the requesting node may be a first mobile node, and the node storing the target content may be a second mobile node. If the first mobile node cannot directly access the second mobile node, for example, both the mobile nodes are deployed in a cellular network, the first node may use a fixed node belonging to the same user identifier as a proxy and request the fixed node belonging to the same user identifier to obtain needed content and forward the content to the first mobile node.

With reference to the first aspect, in some implementations of the first aspect, the routing information includes a first content identifier, a first user identifier corresponding to the first content identifier, and a communication address that corresponds to the first content identifier and that is a preset field; and when a content identifier corresponding to newly added stored content included in a third fixed node is the first content identifier, and a user identifier corresponding to the third fixed node is the first user identifier, the addressing method further includes:

The requesting node obtains updated routing information, where the updated routing information is obtained by updating the communication address that corresponds to the first content identifier and that is a preset field in the routing information to a communication address of the third fixed node, and the third fixed node is any node in the distributed storage network.

In this embodiment, when new stored content is added to a fixed node, a communication address of a fixed node changes, or a fixed node joins the distributed storage network for the first time, the routing information needs to be updated. It may be determined whether routing information that is the same as an identifier of the newly added content and a user identifier corresponding to the identifier of the newly added content exists in the existing routing information. If yes, it may be determined whether a communication address corresponding to the identifier of the newly added content is a preset field. If the communication address is a preset field, the routing information may be updated with a communication address of the fixed node corresponding to the identifier of the newly added content. If the communication address is not a preset field, the communication address is updated. If the routing information that is the same as the identifier of the newly added content and the user identifier corresponding to the identifier of the newly added content does not exist, new routing information including triplet information (the identifier of the newly added content, the user identifier, and a communication address) is added.

With reference to the first aspect, in some implementations of the first aspect, the addressing method further includes: The requesting node obtains updated routing information, where the updated routing information is obtained by updating the routing information with a second content identifier corresponding to newly added stored content of any mobile node and/or a user identifier corresponding to the second content identifier.

In a possible implementation, when new stored content is added to a mobile node, a communication address of a mobile node changes, or a mobile node joins a distributed storage network for the first time, the routing information needs to be updated.

For example, in the existing routing information, if there is the second content identifier and a user ID corresponding to the second content identifier that are respectively the same as the second content identifier and the user identifier corresponding to the second content identifier in the updated routing information, the routing information is routing information that has been updated, and does not need to be updated again.

Alternatively, in the existing routing information, if there is the second content identifier, but a user ID corresponding to the second content identifier is different from the user identifier corresponding to the second content identifier in the updated routing information, the user ID corresponding to the second content identifier in the routing information is updated.

Alternatively, in the existing routing information, if there is no routing information that is the same as the second content identifier, new routing information may be added, that is, recorded routing information is the second content identifier of the new content added to the mobile node and the user ID corresponding to the second content identifier, where a communication address is a preset field.

With reference to the first aspect, in some implementations of the first aspect, the mobile node and the fixed node are relative, where a quantity of times of updating the communication address of the mobile node is greater than a quantity of times of updating the communication address of the fixed node.

It should be understood that the mobile node and the fixed node are two relative concepts. The fixed node may be a terminal device that generally does not move, whose IP address is generally unchanged, or whose IP address rarely changes. The mobile node may be a terminal device that moves frequently or whose IP address changes frequently. For example, the mobile node may be a terminal device such as a smartphone, a tablet, or a portable computer. The fixed node may be a terminal device such as a desktop computer, a smart television, network attached storage, or a smart home device gateway.

According to a second aspect, an addressing system is provided. The addressing system includes a distributed storage network, a user management server, one or more fixed nodes, and a mobile node, the distributed storage network includes the one or more fixed nodes, and the user management server is configured to manage information about the mobile node and the fixed node. A requesting node is configured to obtain routing information of the distributed storage network, where the requesting node is any one of the mobile node and the fixed node, the routing information includes one or more content identifiers, a communication address corresponding to the content identifier, and a user identifier corresponding to the content identifier, and a communication address of a mobile node corresponding to the user identifier in the routing information is a preset field. The requesting node is configured to obtain, based on the routing information, a target communication address corresponding to a target content identifier in the one or more content identifiers. The requesting node is configured to obtain target content based on the target communication address.

In this embodiment, the addressing system may include the distributed storage network, the user management server, the one or more fixed nodes, and the mobile node. The distributed storage network may include the one or more fixed nodes, and the user management server may be configured to manage the information about the mobile node and the fixed node in the system. The requesting node may perform addressing of the target content based on triplet routing information, namely, the routing information that includes the content identifier, the communication address corresponding to the content identifier, and the user identifier corresponding to the content identifier, to obtain the target content. In the triplet routing information, the communication address that is of the mobile node corresponding to the user identifier and that is stored in the routing information may be the preset field, in other words, the communication address of the mobile node included in the routing information is not updated with changes of the communication address of the mobile node. Therefore, frequent changes of routing information of the distributed storage network caused by frequent changes of the communication address of the mobile node are reduced, and network overheads are reduced.

In a possible implementation, the communication address may be an internet protocol IP address.

It should be understood that the communication address corresponding to the content identifier is a communication address of a node that stores content corresponding to the content identifier. The user identifier corresponding to the content identifier is a user identifier of a user to which the node storing the content corresponding to the content identifier belongs.

The content identifier may alternatively be an identifier of the node storing the content.

With reference to the second aspect, in some implementations of the second aspect, the requesting node is configured to: obtain, based on the target content identifier and the routing information, a target user identifier corresponding to the target content identifier; and obtain, based on the target user identifier, a communication address of a mobile node corresponding to the target user identifier.

For example, one user identifier (for example, a user ID) may be registered for one user, and the user may log in to the user identifier on a plurality of terminal devices, so that stored content of the plurality of terminal devices of the user can be synchronized and shared.

For example, the mobile node corresponding to the user identifier may be a terminal device such as a smartphone, a tablet, or a portable computer. The fixed node corresponding to the user identifier may be a terminal device such as a desktop computer, a smart television, network attached storage, or a smart home device gateway.

In a possible implementation, the requesting node may query the routing information based on the target content identifier. If it is found that the communication address corresponding to the target content identifier is a preset field, it indicates that the target content corresponding to the target content identifier is stored on the mobile node. In this case, the requesting node may find, based on the target content identifier, the target user identifier corresponding to the target content identifier, and may obtain, based on the target user identifier, information about the mobile node corresponding to the target user identifier. Further, the requesting node may access the communication address of the mobile node until the target content is obtained.

In a possible implementation, the requesting node may query the routing information based on the target content identifier, find the communication address corresponding to the target content identifier, and access the communication address, but fail to obtain the target content. In this case, the requesting node may find, based on the target content identifier, the target user identifier corresponding to the target content identifier, and may obtain, based on the target user identifier, communication addresses of the mobile node and the fixed node that correspond to the target user identifier, and access the mobile node and the fixed node until the target content is obtained.

In this embodiment, when the requesting node fails to obtain the target content based on the routing information or cannot obtain the communication address of the current mobile node, the requesting node may obtain the target user identifier corresponding to the target content identifier, and then obtain the information about the mobile node and/or the fixed node based on the target user identifier, to obtain the target content.

With reference to the second aspect, in some implementations of the second aspect, the requesting node is further configured to: send a query instruction to the user management server, where the query instruction includes the target user identifier, and the user management server is configured to manage information about a mobile node and a fixed node that belong to the user identifier;

receive a communication address list sent by the user management server, where the communication address list includes the communication address of the mobile node corresponding to the target user identifier.

The user management server may be configured to maintain and manage user identifiers and device information of different users. Device information may include information about all fixed nodes and mobile nodes that belong to an identifier of a user, for example, IP address information and a node type (a mobile node or a fixed node) of a device that belongs to the user.

In this embodiment, the requesting node may query information about the communication address of the mobile node or the fixed node from the user management server based on the target user identifier queried from the routing information. In this way, when the communication address of the mobile node is frequently updated, the routing information in the distributed storage network does not need to be updated for a plurality of times. This reduces network overheads.

With reference to the second aspect, in some implementations of the second aspect, when the requesting node is a fixed node, the requesting node is configured to: send a routing information query instruction, where the routing information query instruction includes the target content identifier; or determine, based on the target content identifier and by using a distributed hash algorithm, information about a fixed node that stores the routing information, and obtain the routing information from the fixed node that stores the routing information.

In a possible implementation, the requesting node may obtain, through preconfiguration, domain name resolution, hypertext transfer protocol redirection, or the like, information about the fixed node that stores the routing information, access the fixed node, and query the routing information.

With reference to the second aspect, in some implementations of the second aspect, the requesting node is the mobile node. The requesting node is configured to: obtain information about a first fixed node from the user management server, where the first fixed node and the requesting node correspond to a same user identifier; send a routing information query instruction to the first fixed node, where the routing information query instruction includes the target content identifier; and obtain the routing information from the first fixed node.

In this embodiment, the requesting node may be a mobile node in a system. When the requesting node is a mobile node, the requesting node may not be deployed on a DHT ring. Therefore, the requesting node cannot directly access the routing information in the distributed storage network. In this case, the requesting node may obtain the routing information from a fixed node that belongs to the same user ID as the requesting node, and the fixed node forwards the routing information to the requesting node.

With reference to the second aspect, in some implementations of the second aspect, the requesting node is configured to: determine a second fixed node based on the user identifier corresponding to the requesting node; and obtain the target content from the second fixed node, where the second fixed node and the requesting node correspond to the same user identifier.

In this embodiment, the requesting node may be a first mobile node, and the node storing the target content may be a second mobile node. If the first mobile node cannot directly access the second mobile node, for example, both the mobile nodes are deployed in a cellular network, the first node may use a fixed node belonging to the same user identifier as a proxy and request the fixed node belonging to the same user identifier to obtain needed content and forward the content to the first mobile node.

With reference to the second aspect, in some implementations of the second aspect, the routing information includes a first content identifier, a first user identifier corresponding to the first content identifier, and a communication address that corresponds to the first content identifier and that is a preset field; and when a content identifier corresponding to newly added stored content included in a third fixed node is the first content identifier, and a user identifier corresponding to the third fixed node is the first user identifier, the requesting node is further configured to: obtain updated routing information, where the updated routing information is obtained by updating the communication address that corresponds to the first content identifier and that is a preset field in the routing information to a communication address of the third fixed node, and the third fixed node is any node in the distributed storage network.

In this embodiment, when new stored content is added to a fixed node, a communication address of a fixed node changes, or a fixed node joins the distributed storage network for the first time, the routing information needs to be updated. It may be determined whether routing information that is the same as an identifier of the newly added content and a user identifier corresponding to the identifier of the newly added content exists in the existing routing information. If yes, it may be determined whether a communication address corresponding to the identifier of the newly added content is a preset field. If the communication address is a preset field, the routing information may be updated with a communication address of the fixed node corresponding to the identifier of the newly added content. If the communication address is not a preset field, the communication address is updated. If the routing information that is the same as the identifier of the newly added content and the user identifier corresponding to the identifier of the newly added content does not exist, new routing information including triplet information (the identifier of the newly added content, the user identifier, and a communication address) is added.

With reference to the second aspect, in some implementations of the second aspect, the requesting node is further configured to: obtain updated routing information, where the updated routing information is obtained by updating the routing information with a second content identifier corresponding to newly added stored content of any mobile node and/or a user identifier corresponding to the second content identifier.

In a possible implementation, when new stored content is added to a mobile node, a communication address of a mobile node changes, or a mobile node joins a distributed storage network for the first time, the routing information needs to be updated.

For example, in the existing routing information, if there is the second content identifier and a user ID corresponding to the second content identifier that are respectively the same as the second content identifier and the user identifier corresponding to the second content identifier in the updated routing information, the routing information is routing information that has been updated, and does not need to be updated again.

Alternatively, in the existing routing information, if there is the second content identifier, but a user ID corresponding to the second content identifier is different from the user identifier corresponding to the second content identifier in the updated routing information, the user ID corresponding to the second content identifier in the routing information is updated.

Alternatively, in the existing routing information, if there is no routing information that is the same as the second content identifier, new routing information may be added, that is, recorded routing information is the second content identifier of the new content added to the mobile node and the user ID corresponding to the second content identifier, where a communication address is a preset field.

With reference to the second aspect, in some implementations of the second aspect, the mobile node and the fixed node are relative, where a quantity of times of updating the communication address of the mobile node is greater than a quantity of times of updating the communication address of the fixed node.

It should be understood that the mobile node and the fixed node are two relative concepts. The fixed node may be a terminal device that generally does not move, whose IP address is generally unchanged, or whose IP address rarely changes. The mobile node may be a terminal device that moves frequently or whose IP address changes frequently. For example, the mobile node may be a terminal device such as a smartphone, a tablet, or a portable computer. The fixed node may be a terminal device such as a desktop computer, a smart television, network attached storage, or a smart home device gateway.

According to a third aspect, an addressing apparatus for a terminal device is provided. The apparatus includes: a transceiver unit, configured to obtain routing information of a distributed storage network, where the distributed storage network includes one or more fixed nodes, the routing information includes one or more content identifiers, a communication address corresponding to the content identifier, and a user identifier corresponding to the content identifier, and a communication address of a mobile node corresponding to the user identifier in the routing information is a preset field; and a processing unit, configured to: obtain, based on the routing information, a target communication address corresponding to a target content identifier in the one or more content identifiers; and obtain target content based on the target communication address.

In this embodiment, the addressing apparatus may perform addressing of the target content based on triplet routing information, namely, the routing information that includes the content identifier, the communication address corresponding to the content identifier, and the user identifier corresponding to the content identifier, to obtain the target content. In the triplet routing information, the communication address that is of the mobile node corresponding to the user identifier and that is stored in the routing information may be the preset field, in other words, the communication address of the mobile node included in the routing information is not updated with changes of the communication address of the mobile node. Therefore, frequent changes of routing information of the distributed storage network caused by frequent changes of the communication address of the mobile node are reduced, and network overheads are reduced.

It should be understood that an extension, a limitation, an explanation, and a description of related content in the first aspect are also applicable to same content in the third aspect.

With reference to the third aspect, in some implementations of the third aspect, the processing unit is configured to: obtain, based on the target content identifier and the routing information, a target user identifier corresponding to the target content identifier; and obtain, based on the target user identifier, a communication address of a mobile node corresponding to the target user identifier.

With reference to the third aspect, in some implementations of the third aspect, the transceiver unit is further configured to: send a query instruction to a user management server, where the query instruction includes the target user identifier, and the user management server is configured to manage information about a mobile node and a fixed node that belong to the user identifier; and receive a communication address list sent by the user management server, where the communication address list includes the communication address of the mobile node corresponding to the target user identifier.

With reference to the third aspect, in some implementations of the third aspect, the addressing apparatus is a fixed node, and the transceiver unit is configured to send a routing information query instruction, where the routing information query instruction includes the target content identifier; or the processing unit is configured to determine, based on the target content identifier and by using a distributed hash algorithm, information about a fixed node that stores the routing information, and the transceiver unit is configured to obtain the routing information from the fixed node that stores the routing information.

With reference to the third aspect, in some implementations of the third aspect, the requesting node is a mobile node, and the transceiver unit is configured to: obtain information about a first fixed node from the user management server, where the first fixed node and the addressing apparatus correspond to a same user identifier; send a routing information query instruction to the first fixed node, where the routing information query instruction includes the target content identifier; and obtain the routing information from the first fixed node.

With reference to the third aspect, in some implementations of the third aspect, the processing unit is configured to determine a second fixed node based on the user identifier corresponding to the addressing apparatus; and the transceiver unit is configured to obtain the target content from the second fixed node, where the second fixed node and the addressing apparatus correspond to the same user identifier.

With reference to the third aspect, in some implementations of the third aspect, the routing information includes a first content identifier, a first user identifier corresponding to the first content identifier, and a communication address that corresponds to the first content identifier and that is a preset field; and when a content identifier corresponding to newly added stored content included in a third fixed node is the first content identifier, and a user identifier corresponding to the third fixed node is the first user identifier, the transceiver unit is further configured to:

obtain updated routing information, where the updated routing information is obtained by updating the communication address that corresponds to the first content identifier and that is a preset field in the routing information to a communication address of the third fixed node, and the third fixed node is any node in the distributed storage network.

With reference to the third aspect, in some implementations of the third aspect, the transceiver unit is further configured to: obtain updated routing information, where the updated routing information is obtained by updating the routing information with a second content identifier corresponding to newly added stored content of any mobile node and/or a user identifier corresponding to the second content identifier.

With reference to the third aspect, in some implementations of the third aspect, the mobile node and the fixed node are relative, where a quantity of times of updating the communication address of the mobile node is greater than a quantity of times of updating the communication address of the fixed node.

According to a fourth aspect, an addressing apparatus is provided. The addressing apparatus includes: a memory, configured to store a program; and a processor, configured to execute a program stored in the memory. When the program stored in the memory is executed, the processor is configured to: obtain routing information of a distributed storage network, where the distributed storage network includes one or more fixed nodes, the routing information includes one or more content identifiers, a communication address corresponding to the content identifier, and a user identifier corresponding to the content identifier, and a communication address of a mobile node corresponding to the user identifier in the routing information is a preset field; obtain, based on the routing information, a target communication address corresponding to a target content identifier in the one or more content identifiers; and obtain target content based on the target communication address.

In a possible implementation, the processor included in the addressing apparatus is further configured to perform the addressing method in any one of the first aspect and the implementations of the first aspect.

It should be understood that an extension, a limitation, an explanation, and a description of related content in the first aspect are also applicable to same content in the fourth aspect.

According to a fifth aspect, a computer-readable medium is provided. The computer-readable medium stores program code to be executed by a device, and the program code includes instructions for performing the addressing method according to any one of the first aspect and the implementations of the first aspect.

According to a sixth aspect, a computer program product including an instruction is provided. When the computer program product runs on a computer, the computer is enabled to execute the addressing method according to any one of the first aspect and the implementations of the first aspect.

According to a seventh aspect, a chip is provided. The chip includes a processor and a data interface, and the processor reads, by using the data interface, instructions stored in a memory, to perform the control method according to any one of the first aspect and the implementations of the first aspect.

BRIEF DESCRIPTION OF DRAWINGS

FIG. 2 is a schematic flowchart of an addressing method according to an embodiment;

FIG. 3 is a schematic flowchart of an addressing method according to an embodiment;

DETAILED DESCRIPTION OF THE EMBODIMENTS

Figure 1:
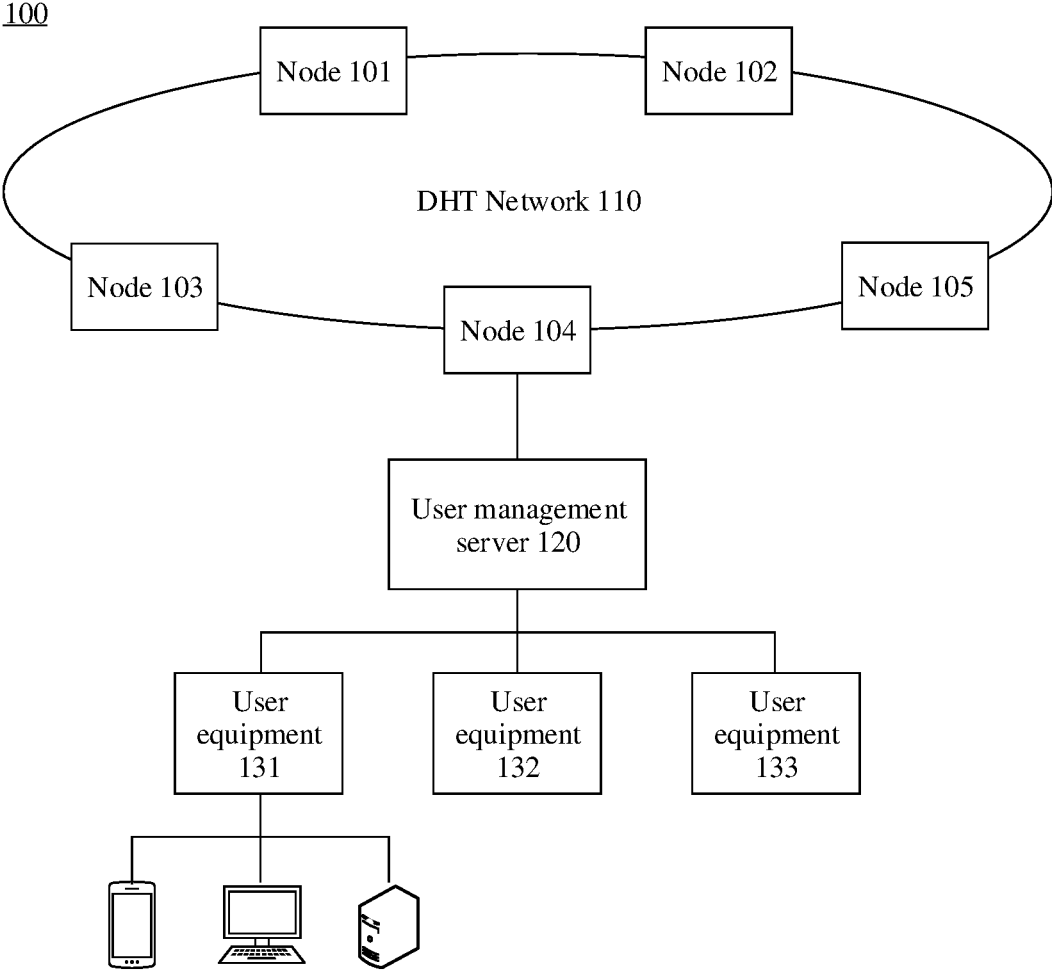
FIG. 1 is a schematic diagram of an architecture of a distributed storage system according to an embodiment.

The following describes solutions in the embodiments with reference to accompanying drawings in embodiments. It is clear that the described embodiments are merely some but not all of the embodiments. All other embodiments obtained by a person of ordinary skill in the art based on the embodiments without creative efforts shall fall within the scope of the embodiments.

With the rapid development of the internet technology, a distributed storage network is provided. For example, each node in a storage system can obtain services from other nodes and can provide services to other nodes. Therefore, a server is no longer necessarily a center of a network, a conventional client/server (C/S) structure in the internet is changed, and a storage mode of the network is changed from "content at the center" to "content at the edge". For example, a distributed storage system may be a peer to peer (P2P) network.

In the distributed storage network, file sharing or streaming media transmission can be performed by using a distributed hash table (DHT). A DHT technology uses routing at an overlay. A DHT network may have a ring topology. Each node in the ring topology may have a unique node identifier ID. The node ID can indicate a logical location of the node in an overlay network and cannot reflect an actual physical location of the node.

For example, the DHT network may be constructed by using a plurality of algorithms, for example, by using a Chord algorithm, a network transport protocol (Kademlia), or another algorithm. Generally, one DHT network can be constructed based on only one algorithm, and a DHT table may be searched for based on the algorithm for constructing the DHT network. In addition, each node in the DHT network may include a part of routing information in the DHT table.

In an existing DHT technology, node query or path selection may be implemented by using DHT routing information (for example, a DHT routing table). For example, addressing of a distributed storage system may be implemented by using the DHT. The DHT routing table may include 2-tuple information, namely, a node ID and a node address. The DHT routing table in the distributed storage network includes IDs and addresses (for example, internet protocol addresses) of an in-order precursor node and an in-order successor node of each node. A target node can be easily found based on routing information in the DHT routing table. However, if a node address of any node in the distributed storage network changes, the DHT routing information is frequently updated. This increases network overheads.

For example, during commutes to and from work every day, an access manner of a mobile device (for example, a mobile phone) is switched at least twice: switching from a home wireless network to a cellular network and switching from the cellular network to a wireless network of a company. If a public wireless network on a subway or a bus is connected to, the access manner may be switched for four to five times within an hour. Each time internet protocol (IP) address information changes, the DHT routing table needs to be updated. It can be understood that, currently, a storage requirement of a mobile terminal device in the distributed storage network cannot be effectively supported by using the DHT technology.

A requesting node may perform addressing of target content based on triplet routing information, namely, routing information that includes a content identifier, a communication address corresponding to the content identifier, and a user identifier corresponding to the content identifier, to obtain the target content. In the triplet routing information, a communication address that is of a mobile node corresponding to the user identifier and that is stored in the routing information may be a preset field, in other words, the communication address of the mobile node included in the routing information is not updated with changes of the communication address of the mobile node. Therefore, frequent changes of routing information of a distributed storage network caused by frequent changes of the communication address of the mobile node are reduced, and network overheads are reduced.

The following describes an architecture of a distributed storage system according to an embodiment with reference to FIG. 1.

It should be noted that, in the embodiments, a content identifier (for example, a content ID) may be a node identifier, in other words, a key value of a node may indicate a content ID stored on the node.

The node may be a device with a processing function. For example, the node may be any computing device known in the conventional technology, for example, a server or a desktop computer. The node may include a memory and a processor. The memory may be configured to store program code, for example, an operating system and another application program. The processor may be configured to invoke the program code stored in the memory, to implement a corresponding function of the node. The processor and the memory included in the node may be implemented by using a chip. This is not limited herein.

FIG. 1 is a schematic diagram of a distributed storage system 100 according to an embodiment.

It should be understood that, to reduce frequent updates of network routing information caused by changes of a communication address (for example, an internet protocol address) of a mobile node, nodes in the system 100 shown in FIG. 1 may be classified into two types, namely, a fixed node and a mobile node.

The mobile node and the fixed node may refer to two relative concepts. The fixed node may be a terminal device that generally does not move, whose IP address is generally unchanged, or whose IP address rarely changes. The mobile node may be a terminal device that moves frequently or whose IP address changes frequently. In other words, compared with the fixed node, the mobile node moves more frequently or the IP address of the mobile node changes more frequently.

For example, the fixed node may be a terminal device such as a desktop computer, a smart television, network attached storage (network attached storage, NAS), or a smart home device gateway.

For example, the mobile node may be a terminal device such as a smartphone, a tablet, or a portable computer.

The distributed storage system 100 shown in FIG. 1 may include a DHT network 110 (that is, a DHT ring), a user management server 120, user equipment 131, user equipment 132, and user equipment 133. The DHT network 110 may be a distributed storage network including one or more fixed nodes, for example, a node 101, a node 102, a node 103, a node 104, and a node 105. Any node in the DHT network 110 may communicate with the user management server 120. The user management server 120 may be configured to maintain and manage user identifiers (for example, user IDs) and device information of different users, where device information may include information about all fixed nodes and mobile nodes that correspond to an identifier of a user, for example, information about a communication address and a node type (a mobile node or a fixed node) of a device that belongs to the user.

The user identifier may be an identifier registered for a user when the user uses an electronic product. Data or services can be synchronized between a plurality of devices used by the user based on the user identifier.

For example, a user $ID_1$ includes a terminal device 1, a terminal device 2, and a terminal device 3. The three terminal devices each may be a mobile node or a fixed node. A cloud-based service may manage a plurality of terminal devices that log in to the user $ID_1$, for example, record current addresses of online devices that belong to the user $ID_1$.

In the distributed storage system, nodes may be classified into a fixed node and a mobile node. The DHT network may include one or more fixed nodes. The mobile node may serve as a client of the DHT network, and access routing information in the DHT network through a specific fixed node (for example, a cloud server, or a fixed node that belongs to a same user identifier as the mobile node). Recorded routing information corresponding to stored content may be stored on a plurality of fixed nodes included in the DHT network.

In an example, routing information recorded in the DHT network may be recorded by using the fixed node, or the mobile node may record a content identifier of content stored on the mobile node into routing information by using the fixed node that belongs to the same user identifier as the mobile node.

For example, the content identifier of the content stored on the mobile node may be recorded into the routing information of the DHT network by using the fixed node that belongs to the same user identifier as the mobile node.

In the system 100 shown in FIG. 1, distributed content may be queried based on the routing information of the DHT network, where the routing information may include triplet information (a content ID, a user ID, and a communication address). The routing information further includes a mapping relationship among the content ID, the user ID, and the communication address. The communication address may be an internet protocol IP address.

For example, a communication address and a user ID that correspond to a content ID that needs to be obtained may be queried based on the content ID and the routing information. If the communication address corresponding to the content ID is null or is another preset field, it indicates that the content ID is stored on a mobile node. In this case, information about all nodes that belong to the user ID may be queried on the user management server based on the user ID, to obtain IP addresses of all mobile nodes that belong to the user ID. Target content corresponding to the content ID is obtained by accessing the obtained communication addresses. If the communication address corresponding to the content ID is not null, an IP address corresponding to the content ID in a DHT routing table is directly accessed to obtain target content corresponding to the content ID.

In an example, as shown in FIG. 1, an addressing system may include the distributed storage network 110, the user management server 120, a fixed node, and a mobile node. The distributed storage network may include one or more fixed nodes, that is, the DHT network 110 may include one or more fixed nodes in user equipment. The user management server 120 may be configured to manage information about the mobile node and the fixed node, in other words, the user management device 120 may be configured to manage a user equipment. A requesting node may be configured to obtain the routing information of the distributed storage network 120, where the requesting node may be any one of the mobile node or the fixed node, and the routing information may include one or more content identifiers, a communication address corresponding to the content identifier, and a user identifier corresponding to the content identifier. A communication address of a mobile node corresponding to the user identifier in the routing information is a preset field. The requesting node is configured to obtain, based on the routing information, a target communication address corresponding to a target content identifier in the one or more content identifiers. The requesting node may be configured to obtain target content based on the target communication address.

It should be understood that the communication address corresponding to the content identifier is a communication address of a node that stores content corresponding to the content identifier. The user identifier corresponding to the content identifier is a user identifier of a user to which the node storing the content corresponding to the content identifier belongs.

In the distributed storage system, the mobile node is separated from the fixed node, to reduce frequent updates of the routing information in the DHT network caused by frequent changes of the communication address (for example, the IP address) of the mobile node. In addition, the user management server can perform mapping between the user identifier and the communication address of the mobile node, so that the content stored on the mobile node can be queried.

Figure 4:
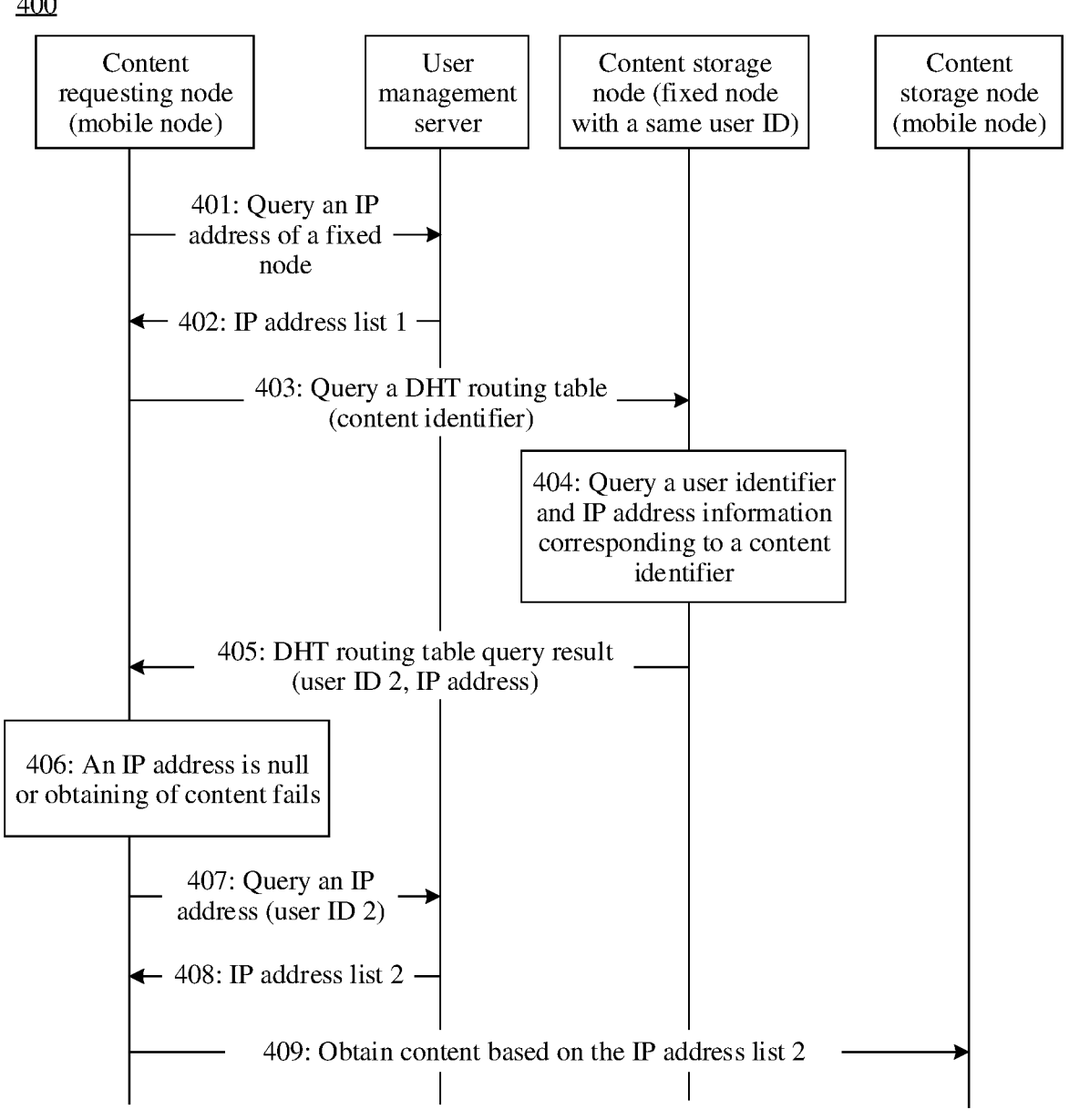
FIG. 4 is a schematic flowchart of an addressing method according to an embodiment.

The following describes in detail an addressing method provided in the embodiments with reference to FIG. 2 to FIG. 4.

FIG. 2 is a schematic flowchart of an addressing method 200 for a mobile device according to an embodiment. The addressing method may be performed by a requesting node, and the requesting node may be a node having a content requesting requirement, for example, a node having a requirement for obtaining content stored in a distributed storage system. The requesting node may be the foregoing mobile node or the foregoing fixed node. The method 200 includes step 210 to step 230. The following separately describes the steps in detail.

Step 210: The requesting node obtains routing information of a distributed storage network.

The routing information may be a routing table. The routing information may include one or more content identifiers, a communication address corresponding to the content identifier, and a user identifier corresponding to the content identifier. A communication address of a mobile node that belongs to the user identifier is a preset field in the routing table.

The communication address corresponding to the content identifier may be a communication address of a node storing content corresponding to the content identifier, for example, an internet protocol (internet protocol, IP) address of the node storing the content corresponding to the content identifier. The user identifier corresponding to the content identifier may be a user identifier corresponding to the node storing the content corresponding to the content identifier. The content may be stored content, for example, may be a stored to-be-downloaded resource.

For example, it is assumed that a content ID 1 is stored on a node 1, an address of the node 1 is an IP address 1, and the node 1 is a device belonging to a user corresponding to a user ID 1. In this case, routing table information may include the content ID 1, the IP address 1, and the user ID 1, and indicates an association between the content ID 1, the IP address 1, and the user ID 1.

For example, that a communication address is a preset field means that when the communication address of the mobile node is updated, the communication address of the mobile node in the routing information remains unchanged. For example, the communication address of the mobile node is a null entry in the routing information or is a preset field that indicates that the communication address is a communication address of a mobile node.

The distributed storage network is a storage network including one or more fixed nodes. The mobile node and the fixed node may be relative concepts, where a quantity of times of updating the communication address of the mobile node is greater than a quantity of times of updating a communication address of the fixed node.

For example, the content identifier may be a node ID in the distributed storage network, that is, may be a resource feature value (info_hash) of the to-be-downloaded resource. Each node in the distributed storage network may maintain one hash table. All information about the node can be stored in the hash table.

Optionally, if the routing information of the DHT network can be stored on one or more fixed nodes in the DHT network, the requesting node may obtain the routing information from the one or more nodes that store the routing information.

For example, the requesting node may obtain, through preconfiguration, domain name resolution (DNS), hypertext transfer protocol (HTTP) redirection, or the like, information about the node that stores the routing table, access the node, and query information of the routing table.

For example, the requesting node may be a fixed node, and the routing table may be stored on the requesting node, or the routing table may be stored on another fixed node.

Optionally, the requesting node may be a fixed node, and that the requesting node obtains the routing table of the distributed storage network may include: The requesting node sends a routing information query instruction to the fixed node in the distributed storage network, where the routing information query instruction includes a target content identifier.

In an example, the routing information (for example, the routing table) may be stored in a plurality of fixed nodes in a hash manner. In other words, when each entry in the routing information may be stored on a node in the DHT network in a hash manner, where the node storing the routing entry is calculated by using a DHT algorithm and based on a content ID, the requesting node may obtain, through calculation by using the same DHT algorithm and based on the target content ID that needs to be obtained, information about a fixed node that can obtain information about a routing table corresponding to the target content ID, and then access the fixed node to query the information about the routing table.

For example, content storage nodes may set content IDs for stored content, then hash the content IDs, and store routing information related to each of the content IDs on an appropriate DHT node based on a result of a hash value. When the requesting node needs to obtain the content, the requesting node may first locate, based on the content ID and by using the same hash algorithm, the node storing routing entry information related to the content ID. Then, the content requesting node may request, from the node, one or more pieces of entry information that are in the routing table and that are related to the content ID.

Optionally, the requesting node may be a fixed node, and that the requesting node obtains the routing information of the distributed storage network may include: The requesting node determines, based on the target content identifier and by using the distributed hash algorithm, information about the fixed node that stores the routing information, and obtains the routing information from the fixed node that stores the routing information.

Optionally, the requesting node may be a mobile node, and that the requesting node obtains the routing information of the distributed storage network may include: The request-ing node obtains information about a first fixed node from a user management server, where the first fixed node and the requesting node correspond to a same user identifier; the requesting node sends a routing information query instruction to the first fixed node, where the routing information query instruction includes the target content identifier; and the requesting node obtains the routing information from the first fixed node.

It should be understood that, when the requesting node is a mobile node, the requesting node may not be deployed on a DHT ring. Therefore, the requesting node cannot directly access other routing information stored in the DHT network. In this case, the requesting node may obtain the routing information from a fixed node that belongs to a same user ID as the requesting node.

It should be noted that a plurality of nodes that belong to a same user may correspond to one user ID, that is, one user ID may be registered for one user, and the user ID is used for logging in to a plurality of terminal devices. If content corresponding to a content ID is stored on the fixed node, an IP address corresponding to the content ID in the routing information is not null nor a preset field. In other words, if a communication address corresponding to a content ID is null, it indicates that the content corresponding to the content ID is stored on a mobile node.

Step 220: The requesting node may obtain, based on the routing information, a target communication address corresponding to the target content identifier in the one or more content identifiers.

For example, the target communication address corresponding to the target content identifier may be an IP address of a node that stores content corresponding to the target content identifier.

Step 230: The requesting node obtains target content based on the target communication address.

The target content may be stored content corresponding to the target content ID.

After the requesting node obtains the routing information (for example, the routing table), the requesting node may query the routing information based on the target content ID that needs to be obtained, to obtain the target communication address, and then access the target communication address to obtain the target content. A process of obtaining the target content may include the following three cases. The following uses examples in which the communication address is an IP address for description.

In a first case, if an IP address associated with the target content ID is found in the routing table based on the target content ID, the requesting node accesses the IP address and successfully obtains the target content.

In a second case, if an IP address associated with the target content ID is found in the routing table based on the target content ID, the requesting node accesses the IP address but fails to obtain the target content.

For example, when the IP address in the routing table is not updated in time, or access by the requesting node fails, the requesting node fails to obtain the target content.

In a third case, it is found, by querying the routing table based on the target content ID, that an IP address associated with the target content ID is null or a preset field.

In the second and third cases, the requesting node may query, based on the target content ID, the routing table for a target user ID related to the target content ID, and obtain an IP address list of all nodes that belong to the target user ID or an IP address list of all mobile nodes that belong to the target user ID from the user management server based on the target user ID, so that the requesting node can obtain the target content by accessing the IP address list.

In an example, when the requesting node fails to obtain the target content based on the target communication address (for example, a target IP address), the addressing method may further include: The requesting node may determine the target user identifier based on the target content identifier and the routing information, and the requesting node may obtain, based on the target user identifier, a communication address (for example, an IP address) of a mobile node corresponding to the target user identifier.

In another example, when the requesting node determines, based on the target content identifier and the routing information, that the target communication address (for example, the target IP address) corresponding to the target content identifier is a preset field, the requesting node may determine the target user identifier based on the target content identifier and the routing information, and the requesting node may obtain, based on the target user identifier, a communication address (for example, an IP address) of a mobile node corresponding to the target user identifier.

Further, that the requesting node determines, based on the target content identifier and the routing information, a target communication address corresponding to the target content identifier may include: The requesting node may send a query instruction to the user management server, where the query instruction includes the target user identifier; and the requesting node may receive a communication address list sent by the user management server, where the communication address list may include the communication address of the mobile node corresponding to the target user identifier.

For example, when the query instruction includes only the target user identifier, the user management server may send a communication address list of all nodes that belong to the target user identifier to the requesting node, in other words, may send a communication address list of the mobile node and a fixed node that are associated with the target user identifier.

For example, a user $ID_2$ includes a terminal device 1, a terminal device 2, and a terminal device 3. The terminal device 1 is a fixed node, for example, a terminal device such as a desktop computer, a smart television, network attached storage, or a smart home device gateway. The terminal device 2 and the terminal device 3 each are a mobile node, for example, a terminal device such as a smartphone, a tablet, or a portable computer. The requesting node sends a query instruction to the user management server, where the query instruction includes the user $ID_2$. In this case, the user management server may send current latest communication addresses of the terminal device 2 and the terminal device 3 to the requesting node.

For example, the query instruction may include the target user identifier and a node type.

For example, the query instruction may include the target user identifier and a mobile node type. The user management server may send, to the requesting node, a communication address list of all mobile nodes that belong to the target user identifier.

In an example, the requesting node sends a query instruction to the user management server, where the query instruction may include a user ID, and the user management server may send, to the requesting node, a communication address of a mobile node associated with the user ID, or communication addresses of all nodes associated with the user ID.

In an example, the requesting node may send a query instruction to the user management server, where the query instruction may include a user ID and a mobile node type, and the user management server may send, to the requesting node, a communication address of a mobile node associated with the user ID.

Further, when new stored content is added to a node, a communication address of a node changes, or a node joins the DHT network for the first time, information about stored content needs to be updated in the distributed storage network, that is, the node storing the routing table needs to update the routing table, and the requesting node needs to obtain an updated routing table.

In a possible implementation, when new stored content is added to a fixed node, a communication address of a fixed node changes, or a fixed node joins the distributed storage network for the first time, the routing information needs to be updated.

For example, the routing information includes a first content identifier, a first user identifier corresponding to the first content identifier, and a communication address that corresponds to the first content identifier and that is a preset field. When a content identifier corresponding to newly added stored content included in a third fixed node is the first content identifier, and a user identifier corresponding to the third fixed node is the first user identifier, the addressing method further includes:

The requesting node may obtain updated routing information, where the updated routing information may be obtained by updating the communication address that corresponds to the first content identifier and that is a preset field to a communication address of the third fixed node, and the third fixed node is any node in the distributed storage network.

A node storing routing information may generate a content ID based on the newly added stored content and obtain a resource feature value info_hash by using a hash algorithm. Then, the node sends an update message to the distributed storage network. For example, the node may send resource information of the node by using an announce message to an adjacent node, where content carried in the announce message includes triplet information (a content ID, a user ID, and a communication address). After receiving the update message, the adjacent node updates a routing table on the adjacent node.

For example, it is determined whether a routing entry that is the same as an ID of the newly added content and a user ID corresponding to the ID of the newly added content exists in the existing routing information. If the routing entry exists in the existing routing information, it may be determined whether an IP address corresponding to the ID of the newly added content is null. If the IP address is null, an IP address of a fixed node corresponding to the ID of the newly added content is added to the routing entry. If the IP address is not null, the IP address is updated. If the routing entry that is the same as the ID of the newly added content and the user ID corresponding to the ID of the newly added content does not exist, a new routing entry including triplet information (a content ID, a user ID, and an IP address) is added.

In a possible implementation, when new stored content is added to a mobile node, a communication address of a mobile node changes, or a mobile node joins the distributed storage network for the first time, the routing information needs to be updated.

For example, when a first mobile node includes newly added stored content, the addressing method further includes:

The requesting node may obtain updated routing information, where the updated routing information may be obtained by updating the routing information with a second content identifier corresponding to the newly added stored content and/or a user identifier corresponding to the second content identifier.

For example, a node storing routing information may generate a content ID based on the newly added stored content and obtain a resource feature value info_hash by using a hash algorithm. Information about a fixed node that stores routing information of the content ID is obtained through calculation by using a DHT algorithm and based on an ID of the newly added stored content, and the routing information stored on the fixed node is updated.

For example, in the existing routing information, if there is the second content identifier and a user ID corresponding to the second content identifier that are respectively the same as the second content identifier and the user identifier corresponding to the second content identifier in the updated routing information, the routing information is routing information that has been updated, and does not need to be updated again.

Alternatively, in the existing routing information, if there is the second content identifier, but a user ID is different from the user identifier corresponding to the second content identifier, the user ID corresponding to the second content identifier in the routing table is updated.

Alternatively, in the existing routing information, if there is no routing table information that is the same as the second content identifier, new routing information may be added, that is, recorded updated routing information is the second content identifier of the new content added to the mobile node and the user ID corresponding to the second content identifier, where a communication address is a preset field.

In this embodiment, the requesting node may perform addressing of the target content based on triplet routing information, namely, the routing information that includes the content identifier, the communication address corresponding to the content identifier, and the user identifier corresponding to the content identifier, to obtain the target content. In the triplet routing information, the communication address that is of the mobile node corresponding to the user identifier and that is stored in the routing information may be the preset field, in other words, the communication address of the mobile node included in the routing information is not updated with changes of the communication address of the mobile node. Therefore, frequent changes of the routing information of the distributed storage network caused by frequent changes of the communication address of the mobile node are reduced, and network overheads are reduced.

With reference to FIG. 3, the following describes in detail a specific procedure of a method in which a requesting node (for example, a fixed node) performs addressing on a mobile node. A method 300 includes step 310 to step 340. The following separately describes the steps in detail. It should be understood that a content requesting node shown in FIG. 3 may be the requesting node in FIG. 2.

Step 310: The content requesting node (for example, a fixed node) queries a DHT routing table based on a content identifier (for example, a content ID).

It should be noted that the content ID may be a node ID in a DHT network, that is, may be a resource feature value (info_hash) of a to-be-downloaded resource. In the DHT network, each node may maintain one hash table, and the hash table may include all information about the node. When a resource download request sent by a client node is received, the node may query shared resource information based on the hash table and return a query result.

Step 310 may include: The content requesting node obtains the DHT routing table and queries, based on the content ID, a needed routing entry in the DHT routing table.

In an example, the DHT routing table may be stored on the content requesting node, and the content requesting node may directly obtain the routing table.

In another example, the routing table may be stored on another fixed node, and the content requesting node may obtain the DHT routing table from the node that stores the routing table.

In an example, the routing table may be stored in a hash manner on nodes in the DHT network, and the content requesting node may obtain, through calculation based on the content ID and by using a DHT algorithm that is used when a storage node stores the DHT routing table, information about a fixed node that can obtain the DHT routing entry.

It should be noted that, when the routing table is stored on the nodes in the DHT network in the hash manner, when the routing table is to be stored, each of the nodes that stores a part of entries in the DHT routing table may be determined based on the content ID and by using the DHT algorithm. Therefore, when the content requesting node needs to obtain the routing table, the content requesting node needs to first determine, based on the content ID and by using the same DHT algorithm, a node storing a part of entries, and then obtain the needed entry in the routing table from the node storing the part of entries.

Further, after obtaining the routing table, the content requesting node may query the routing table based on the content ID. If the routing table includes the content ID and a user ID corresponding to the content ID, but an IP address is null, it indicates that content queried by the requesting node is stored on a mobile node of a corresponding user. Therefore, the content requesting node needs to obtain, based on the user ID, the IP address corresponding to the content ID.

Alternatively, in another possible case, if the routing table includes the content ID, the user ID corresponding to the content ID, and an IP address corresponding to the content ID, in other words, the IP address corresponding to the content ID is not null, the content requesting node may request to obtain needed content from a node storing the content based on the IP address in the routing entry.

Optionally, if an IP address corresponding to a content ID exists in the routing entry, but the content requesting node fails to obtain content from a corresponding node, the content requesting node also needs to obtain, based on the user ID, the IP address corresponding to the content ID.

Step 320: The content requesting node sends an IP address query instruction to a user management server.

The IP address query instruction includes the user ID corresponding to the content ID in the routing table in step 310, that is, a target user ID.

The user management server may be configured to maintain and manage user IDs and device information of different users. Device information may include information about all fixed nodes and mobile nodes that belong to an ID of a user, for example, IP address information and a node type (a mobile node or a fixed node) of a device that belongs to the user.

Step 330: The user management server sends an IP address list that belongs to the target user identifier to the content requesting node.

In an example, the user management server may send, to the content requesting node, an IP address list including IP addresses of all nodes that belong to the target user ID.

In another example, the IP address query instruction sent by the content requesting node and received by the user management server may include the target user ID and node type information.

For example, if the IP address query instruction received by the user management server may include an IP address of a target user and a mobile node type, the user management server may send an IP address list including all IP addresses of mobile nodes that belong to the target user ID to the content requesting node.

Step 340: The content requesting node obtains the needed content based on the IP address list.

For example, the content requesting node may request content from all mobile nodes based on the IP address list until the needed content is obtained.

In the foregoing steps, fixed nodes may perform communication based on a KRPC message of a user datagram protocol (UDP), for example, to search for and share resources by using a test (PING) instruction, a node query (FIND_NODE) instruction, a resource download request (GET_PEERS) instruction, and an announcement (ANNOUNCE) instruction. The PING instruction can be used for testing whether a node is online and provides a response normally. The FIND_NODE instruction may request an adjacent node to find node information of a node closer to a target node. The GET_PEERS instruction can be used for requesting to query the target node for information about nodes that share same resources, and a node that requests to download a resource obtains an address of a resource sharing node from the target node. The ANNOUNCE instruction can be used for declaring resource information (for example, a feature value of a shared resource) that belongs to a node and an IP address of the node to an adjacent node.

With reference to FIG. 3, the foregoing describes in detail the addressing method when the requesting node is a mobile node. The following describes in detail a specific procedure of the addressing method for the requesting node (for example, the mobile node) to a mobile node with reference to FIG. 4. A method 400 includes step 401 to step 409. The following separately describes the steps in detail. It should be understood that the content requesting node shown in FIG. 4 may be the requesting node in FIG. 2.

It should be noted that, although a mobile node does not need to access the DHT network, the mobile node can, as a fixed node does, use the content ID and the DHT algorithm to calculate a fixed node that can obtain information of the DHT routing table, and query the DHT routing table from the fixed node. However, different from the fixed node, the mobile node may not have direct access to a fixed node in the DHT network.

Step 401: The content requesting node queries an IP address of a fixed node corresponding to a same user identifier as the content requesting node. For example, the content requesting node sends a user identifier 1 (for example, a user ID 1) to the user management server.

When the content requesting node is a mobile node, the mobile node does not store the DHT routing table. The mobile node may obtain the IP address of the fixed node with the same user ID as the mobile node from the user management server, to obtain the DHT routing table.

For example, if the content requesting node is a mobile node, and the mobile node belongs to the user ID 1, the content requesting node may send the user ID 1, or the user ID 1 and a fixed node type to the user management server, to query an IP address of a fixed node that belongs to the user ID 1.

Step 402: The user management server may send an IP address list 1 of one or more fixed nodes that belong to the user ID 1 to the content requesting node.

The IP address list 1 of the one or more fixed nodes may include IP address information of the one or more fixed nodes.

Step 403: The content requesting node sends a DHT routing table query instruction to one or more fixed nodes based on the IP address list 1 of the one or more fixed nodes.

The DHT routing table query instruction carries an ID of the needed content.

Step 404: A fixed node that receives the query instruction obtains information about the routing table.

In an example, the fixed node receiving the query instruction may obtain, through calculation based on the content ID and by using the DHT algorithm, information about a fixed node that can obtain the DHT routing table, where the fixed node that can obtain the DHT routing table may be the node receiving the query instruction or may be another fixed node.

Further, the fixed node receiving the query instruction may obtain the DHT routing table, query an entry with the same content ID in the DHT routing table based on the routing table, and send a routing table including the user ID corresponding to the same content ID and the IP address corresponding to the same content ID to the content requesting node.

Step 405: The content requesting node receives a query result of the routing table.

After receiving the query result, the following three possible cases for the content requesting node may be included.

Case 1:

In the routing table received by the content requesting node, the user identifier corresponding to the content ID is a user ID 2, the IP address corresponding to the content ID is not null, and the IP address may be an IP address 1. Further, the content requesting node may successfully obtain the needed content based on the IP address 1.

Case 2:

In the routing table received by the content requesting node, the user identifier corresponding to the content ID is a user ID 2, the IP address corresponding to the content ID is not null, and the IP address may be an IP address 1. Further, the content requesting node may obtain the needed content based on the IP address 1, but the obtaining of the content fails.

Case 3:

In the routing table received by the content requesting node, the user identifier corresponding to the content ID is a user ID 2, and the IP address corresponding to the content ID is null.

When the case 2 and the case 3 occur, the content requesting node needs to obtain an IP address corresponding to the content ID based on the user ID 2, in other words, to perform the following steps 407 to 408.

Step 406: The content requesting node determines that the IP address corresponding to the content identifier (for example, the content ID) is null, or the content requesting node fails to obtain the content based on the IP address.

Step 407: The content requesting node sends an IP address query instruction to the user management server.

The IP address query instruction may include the user ID 2.

The user management server may be configured to maintain and manage user IDs and device information of different users. Device information may include information about all fixed nodes and mobile nodes that belong to an ID of a user, for example, IP address information and a node type (a mobile node or a fixed node) of a device that belongs to the user.

Step 408: The user management server sends an IP address list 2 that belongs to a target user identifier 2 (for example, the user ID 2) to the content requesting node.

In an example, the user management server may send, to the content requesting node, an IP address list including IP addresses of all nodes that belong to the target user ID 2.

In an example, the IP address query instruction sent by the content requesting node and received by the user management server may include the target user ID 2 and node type information.

For example, if the IP address query instruction received by the user management server may include an IP address of a target user and a mobile node type, the user management server may send an IP address list including all IP addresses of mobile nodes that belong to the target user ID 2 to the content requesting node.

Step 409: The content requesting node obtains the needed content based on the IP address list 2.

For example, the content requesting node may request content from all mobile nodes based on the IP address list 2 until the needed content is obtained.

Optionally, in the foregoing steps, when both the content requesting node and the node storing the content are mobile nodes, if a content requester cannot directly access a content requestee, for example, both the mobile nodes are deployed in a cellular network, the content requesting node may use a fixed node belonging to the same user ID as a proxy, and request the fixed node belonging to the same user ID to obtain the needed content and forward the needed content to the content requesting node.

For example, when both the content requesting node and the node storing the content are mobile nodes, the content requesting node corresponds to a user ID 3, and the node storing the content corresponds to a user ID 4. The content requesting node may send a content query request (the content ID) to a fixed node that belongs to the user ID 3. The fixed node obtains the needed content based on content ID and forwards the content to the content requesting node.

According to the addressing method, the requesting node may perform addressing of target content based on triplet routing information, namely, routing information that includes a content identifier, a communication address corresponding to the content identifier, and a user identifier corresponding to the content identifier, to obtain the target content. In the triplet routing information, the communication address that is of the mobile node corresponding to the user identifier and that is stored in the routing information may be a preset field, in other words, the communication address of the mobile node included in the routing information is not updated with changes of the communication address of the mobile node. Therefore, frequent changes of routing information of the distributed storage network caused by frequent changes of the communication address of the mobile node are reduced, and network overheads are reduced.

It should be noted that the foregoing example description is merely intended to help a person skilled in the art understand the embodiments, instead of limiting the embodiments to the illustrated value or scenario. A person skilled in the art definitely can make various equivalent modifications or changes based on the examples described above, and such modifications or changes also fall within the scope of the embodiments.

The foregoing describes in detail the addressing method for a terminal device in the embodiments with reference to FIG. 1 to FIG. 4. The following describes in detail apparatus embodiments with reference to FIG. 5 and FIG. 6. It should be understood that an addressing apparatus in the embodiments may perform the addressing methods in the foregoing embodiments. For working processes of the following various products, refer to corresponding processes in the foregoing method embodiments.

Figure 5:
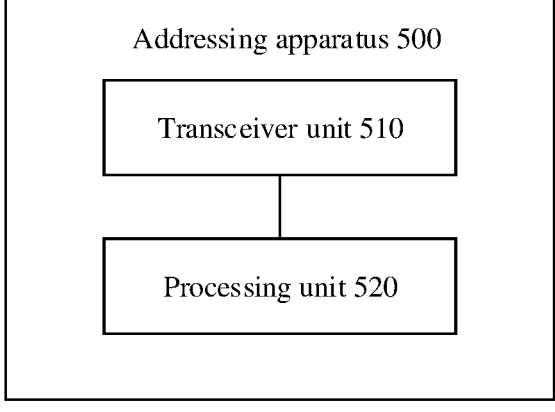
FIG. 5 is a schematic diagram of a structure of an addressing apparatus according to an embodiment.

FIG. 5 is a schematic block diagram of an addressing apparatus according to an embodiment. It should be understood that an addressing apparatus 500 may perform the addressing methods shown in FIG. 2 to FIG. 4. The addressing apparatus 500 includes a transceiver unit 510 and a processing unit 520.

The transceiver unit 510 is configured to obtain routing information of a distributed storage network, where the distributed storage network includes one or more fixed nodes, the routing information includes one or more content identifiers, a communication address corresponding to the content identifier, and a user identifier corresponding to the content identifier, and a communication address of a mobile node corresponding to the user identifier in the routing information is a preset field.

The processing unit 520 is configured to: obtain, based on the routing information, a target communication address corresponding to a target content identifier in the one or more content identifiers; and obtain target content based on the target communication address.

Optionally, in an embodiment, the processing unit 520 is configured to:

obtain, based on the target content identifier and the routing information, a target user identifier corresponding to the target content identifier; and obtain, based on the target user identifier, a communication address of a mobile node corresponding to the target user identifier.

Optionally, in an embodiment, the transceiver unit 510 is further configured to:

send a query instruction to a user management server, where the query instruction includes the target user identifier, the user management server is configured to manage information about a mobile node and a fixed node that correspond to at least one user identifier, and the at least one user identifier includes the target user identifier; and receive a communication address list sent by the user management server, where the communication address list includes the communication address of the mobile node corresponding to the target user identifier.

Optionally, in an embodiment, when the addressing apparatus 500 is a fixed node, the transceiver unit 510 is configured to send a routing information query instruction, where the routing information query instruction includes the target content identifier; or the processing unit 520 is configured to determine, based on the target content identifier and by using a distributed hash algorithm, information about a fixed node that stores the routing information, and the transceiver unit 510 is configured to obtain the routing information from the fixed node that stores the routing table.

Optionally, in an embodiment, when the addressing apparatus 500 is a mobile node, the transceiver unit 510 is configured to:

obtain information about a first fixed node from the user management server, where the first fixed node and the addressing apparatus correspond to a same user identifier;

send a routing information query instruction to the first fixed node, where the routing information query instruction includes the target content identifier; and obtain the routing information from the first fixed node.

Optionally, in an embodiment, the processing unit 520 is configured to determine a second fixed node based on the user identifier corresponding to the addressing apparatus, where the second fixed node and the addressing apparatus correspond to the same user identifier; and the transceiver unit 510 is configured to obtain the target content from the second fixed node.

Optionally, in an embodiment, the routing information includes a first content identifier, a first user identifier corresponding to the first content identifier, and a communication address that corresponds to the first content identifier and that is a preset field. When a content identifier corresponding to newly added stored content included in a third fixed node is the first content identifier, and a user identifier corresponding to the third fixed node is the first user identifier, the transceiver unit 510 is further configured to:

obtain updated routing information, where the updated routing information is obtained by updating the communication address that corresponds to the first content identifier and that is a preset field to a communication address of the third fixed node, and the third fixed node is any node in the distributed storage network.

Optionally, in an embodiment, the transceiver unit 510 is further configured to:

obtain updated routing information, where the updated routing information is obtained by updating the routing information with a second content identifier corresponding to newly added stored content of any mobile node and/or a user identifier corresponding to the second content identifier.

Optionally, in an embodiment, a quantity of times of updating the communication address of the mobile node is greater than a quantity of times of updating the communication address of the fixed node.

It should be noted that the addressing apparatus 500 is embodied in a form of functional units. The term "unit" herein may be implemented in a form of software and/or hardware. This is not limited.

For example, the "unit" may be a software program, a hardware circuit, or a combination thereof for implementing the foregoing function. The hardware circuit may include an application-specific integrated circuit (ASIC), an electronic circuit, a processor (for example, a shared processor, a dedicated processor, or a group processor) configured to execute one or more software or firmware programs and a memory, a merged logic circuit, and/or another appropriate component that supports the described function.

Therefore, the units in the examples described in this embodiment can be implemented by using electronic hardware, or a combination of computer software and electronic hardware. Whether the functions are performed by hardware or software depends on particular applications and constraints of the solutions. A person skilled in the art may use different methods to implement the described functions of each particular application, but it should not be considered that the implementation goes beyond the scope of the embodiments.

Figure 6:
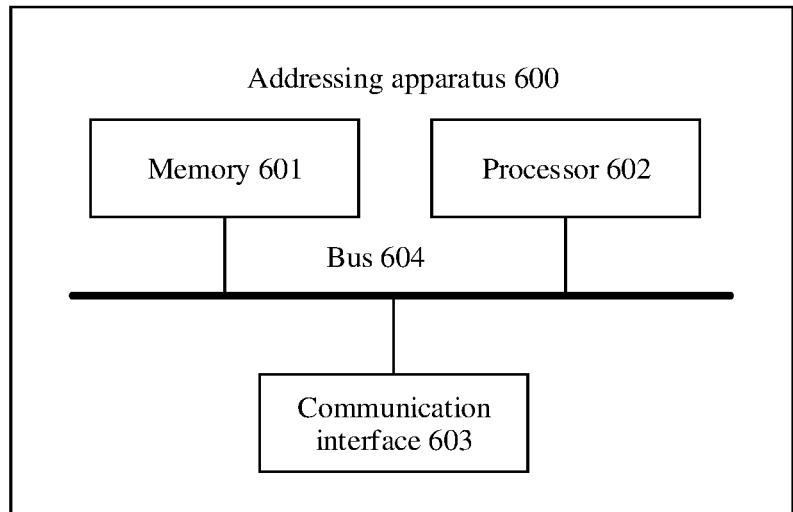
FIG. 6 is a schematic diagram of a structure of another addressing apparatus according to an embodiment.

FIG. 6 is a schematic diagram of a hardware structure of an addressing apparatus according to embodiment. An addressing apparatus 600 shown in FIG. 6 includes a memory 601, a processor 602, a communication interface 603, and a bus 604. The memory 601, the processor 602, and the communication interface 603 can communicate with each other through the bus 604.

The memory 601 may be a read-only memory (ROM), a static storage device, a dynamic storage device, or a random access memory (RAM). The memory 601 may store a program. When the program stored in the memory 601 is executed by the processor 602, the processor 602 is configured to perform the steps of the addressing method in the embodiments, for example, to perform the steps shown in FIG. 2 to FIG. 4.

It should be understood that the addressing apparatus shown in this embodiment may be the requesting node shown in FIG. 2 or may be the content requesting node shown in FIG. 3 or FIG. 4.

The processor 602 may alternatively be an integrated circuit chip and has a signal processing capability. In an implementation process, steps of the addressing method may be completed by using a hardware integrated logic circuit or instructions in a form of software in the processor 602.

The processor 602 may alternatively be a general-purpose processor, a central processing unit (CPU), a digital signal processor (DSP), an application specific integrated circuit (ASIC), a field programmable gate array (field programmable gate array, FPGA) or another programmable logic device, a discrete gate or a transistor logic device, or a discrete hardware component. The processor 602 may implement or perform the methods, steps, and logical block diagrams in the embodiments. The general-purpose processor may be a microprocessor, or the processor may be any conventional processor, or the like. Steps of the methods described with reference to the embodiments may be directly executed and accomplished by using a hardware decoding processor or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 601, and the processor 602 reads information in the memory 601, and completes, in combination with hardware of the processor 602, functions that need to be performed by the unit included in the addressing apparatus shown in FIG. 5 in the embodiments; or performs the addressing methods shown in FIG. 2 to FIG. 4 in the method embodiments.

The communication interface 603 uses a transceiver apparatus, for example, including but not limited to a transceiver, to implement communication between the addressing apparatus 600 and another device or a communication network.

The bus 604 may include a channel through which information is transmitted between parts (for example, the memory 601, the processor 602, and the communication interface 603) of the addressing apparatus 600.

It should be noted that although only the memory, the processor, and the communication interface in the addressing apparatus 600 are shown, in a specific implementation process, a person skilled in the art should understand that the addressing apparatus 600 may further include another component required for implementing normal running. In addition, based on a specific requirement, a person skilled in the art should understand that the addressing apparatus 600 may further include a hardware component for implementing another additional function. In addition, a person skilled in the art should understand that the addressing apparatus 600 may include only components required for implementing this embodiment but does not need to include all the components shown in FIG. 6.

The term "and/or" describes only an association relationship for describing associated objects and represents that three relationships may exist. For example, A and/or B may represent the following three cases: only A exists, both A and B exist, and only B exists. In addition, the character "/" generally indicates an "or" relationship between the associated objects.

It should be understood that sequence numbers of the foregoing processes do not mean execution sequences in various embodiments. The execution sequences of the processes should be determined according to functions and internal logic of the processes and should not be construed as any limitation on the implementation processes of the embodiments.

A person of ordinary skill in the art may be aware that, in combination with the examples described in the embodiments, units and algorithm steps may be implemented by using electronic hardware or a combination of computer software and electronic hardware. Whether the functions are performed by hardware or software depends on particular applications and constraints of the solutions. A person skilled in the art may use different methods to implement the described functions of each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments, it should be understood that the system, apparatus, and method may be implemented in other manners. For example, described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional modules in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such understanding, the solutions essentially, or the part contributing to the conventional technology, or some of the solutions may be implemented in a form of a software product. The computer software product is stored in a storage medium and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations, but are not intended to limit the scope of the embodiments. Any variation or replacement readily figured out by a person skilled in the art shall fall within the scope of the embodiments.

What is claimed is:

1. An addressing method, comprising:

obtaining, by a requesting node, routing information of a distributed storage network, wherein the distributed storage network comprises one or more fixed nodes, the routing information comprises one or more content identifiers, a communication address corresponding to the content identifier, and a user identifier corresponding to the content identifier, and a communication address of a mobile node corresponding to the user identifier in the routing information is a preset field;

obtaining, by the requesting node based on the routing information, a target communication address corresponding to a target content identifier in the one or more content identifiers, wherein obtaining, by the requesting node based on the routing information, the target communication address corresponding to the target content identifier in the one or more content identifiers further comprises:

obtaining, by the requesting node based on the target content identifier and the routing information, a target user identifier corresponding to the target content identifier; and obtaining, by the requesting node based on the target user identifier, a communication address of a mobile node corresponding to the target user identifier, wherein obtaining, by the requesting node based on the target user identifier, the communication address of the mobile node corresponding to the target user identifier further comprises:

sending, by the requesting node, a query instruction to a user management server, wherein the query instruction comprises the target user identifier, the user management server is configured to manage information about a mobile node and a fixed node that correspond to at least one user identifier, and the at least one user identifier comprises the target user identifier; and receiving, by the requesting node, a communication address list sent by the user management server, wherein the communication address list comprises the communication address of the mobile node corresponding to the target user identifier; and obtaining, by the requesting node, target content based on the target communication address.

2. The addressing method according to claim 1, wherein, when the requesting node is a fixed node, obtaining, by the requesting node, the routing information of the distributed storage network further comprises:

sending, by the requesting node, a routing information query instruction, wherein the routing information query instruction comprises the target content identifier; or determining, by the requesting node based on the target content identifier and by using a distributed hash algorithm, information about a fixed node that stores the routing information, and obtaining, by the requesting node, the routing information from the fixed node that stores the routing information.

3. The addressing method according to claim 1, wherein, when the requesting node is a mobile node, obtaining, by the requesting node, the routing information of the distributed storage network further comprises:

obtaining, by the requesting node, information about a first fixed node from the user management server, wherein the first fixed node and the requesting node correspond to a same user identifier;

sending, by the requesting node, a routing information query instruction to the first fixed node, wherein the routing information query instruction comprises the target content identifier; and obtaining, by the requesting node, the routing information from the first fixed node.

4. The addressing method according to claim 1, wherein obtaining, by the requesting node, the target content based on the target communication address further comprises:

determining, by the requesting node, a second fixed node based on the user identifier corresponding to the requesting node; and obtaining, by the requesting node, the target content from the second fixed node, wherein the second fixed node and the requesting node correspond to the same user identifier.

5. The addressing method according to claim 1, wherein the routing information comprises a first content identifier, a first user identifier corresponding to the first content identifier, and a communication address that corresponds to the first content identifier and that is a preset field; and when a content identifier corresponding to newly added stored content comprised in a third fixed node is the first content identifier, and a user identifier corresponding to the third fixed node is the first user identifier, the addressing method further comprises:

obtaining, by the requesting node, updated routing information, wherein the updated routing information is obtained by updating the communication address that corresponds to the first content identifier and that is a preset field to a communication address of the third fixed node, and the third fixed node is any node in the distributed storage network.

6. The addressing method according to claim 1, further comprising:

obtaining, by the requesting node, updated routing information, wherein the updated routing information is obtained by updating the routing information with a second content identifier corresponding to newly added stored content of any mobile node and/or a user identifier corresponding to the second content identifier.

7. The addressing method according to claim 1, wherein a quantity of times of updating the communication address of the mobile node is greater than a quantity of times of updating the communication address of the fixed node.

8. An addressing system, comprising: a distributed storage network, a user management server, one or more fixed nodes, and a mobile node, the distributed storage network comprises the one or more fixed nodes, and the user management server is configured to manage user identifiers and device information for a plurality of users, the device information including, for at least one of the user identifiers, information about at least one fixed node and at least one mobile node associated with the at least one user identifier;

a requesting node is configured to obtain routing information of the distributed storage network, wherein the requesting node is any one of the mobile node and the fixed node, the routing information comprises one or more content identifiers, a communication address corresponding to the content identifier, and a user identifier corresponding to the content identifier, and a communication address of a mobile node corresponding to the user identifier in the routing information is a preset field;

the requesting node is configured to obtain, based on the routing information, a target communication address corresponding to a target content identifier in the one or more content identifiers; and the requesting node is configured to obtain target content based on the target communication address, wherein the requesting node is further configured to:

obtain, based on the target content identifier and the routing information, a target user identifier corresponding to the target content identifier;

obtain, based on the target user identifier, a communication address of a mobile node corresponding to the target user identifier;

send a query instruction to the user management server, wherein the query instruction comprises the target user identifier; and receive a communication address list sent by the user management server, wherein the communication address list comprises the communication address of the mobile node corresponding to the target user identifier.

9. The addressing system according to claim 8, wherein, when the requesting node is a fixed node, the requesting node is further configured to:

send a routing information query instruction, wherein the routing information query instruction comprises the target content identifier; or determine, based on the target content identifier and by using a distributed hash algorithm, information about a fixed node that stores the routing information, and obtain the routing information from the fixed node that stores the routing information.

10. The addressing system according to claim 8, wherein, when the requesting node is a mobile node, the requesting node is further configured to:

obtain information about a first fixed node from the user management server, wherein the first fixed node and the requesting node correspond to a same user identifier;

send a routing information query instruction to the first fixed node, wherein the routing information query instruction comprises the target content identifier; and obtain the routing information from the first fixed node.

11. The addressing system according to claim 8, wherein the requesting node is further configured to:

determine a second fixed node based on the user identifier corresponding to the requesting node; and obtain the target content from the second fixed node, wherein the second fixed node and the requesting node correspond to the same user identifier.

12. The addressing system according to claim 8, wherein the routing information comprises a first content identifier, a first user identifier corresponding to the first content identifier, and a communication address that corresponds to the first content identifier and that is a preset field; and when a content identifier corresponding to newly added stored content comprised in a third fixed node is the first content identifier, and a user identifier corresponding to the third fixed node is the first user identifier, the requesting node is further configured to:

obtain updated routing information, wherein the updated routing information is obtained by updating the communication address that corresponds to the first content identifier and that is a preset field to a communication address of the third fixed node, and the third fixed node is any node in the distributed storage network.

13. The addressing system according to claim 8, wherein the requesting node is further configured to:

obtain updated routing information, wherein the updated routing information is obtained by updating the routing information with a second content identifier corresponding to newly added stored content of any mobile node and/or a user identifier corresponding to the second content identifier.

14. The addressing system according to claim 8, wherein a quantity of times of updating the communication address of the mobile node is greater than a quantity of times of updating the communication address of the fixed node.

15. An addressing apparatus, comprising:

a transceiver unit, configured to obtain routing information of a distributed storage network, wherein the distributed storage network comprises one or more fixed nodes, the routing information comprises one or more content identifiers, a communication address corresponding to the content identifier, and a user identifier corresponding to the content identifier, and a communication address of a mobile node corresponding to the user identifier in the routing information is a preset field;

a processing unit, configured to:

obtain, based on the routing information, a target communication address corresponding to a target content identifier in the one or more content identifiers;

obtain target content based on the target communication address;

obtain, based on the target content identifier and the routing information, a target user identifier corresponding to the target content identifier; and obtain, based on the target user identifier, a communication address of a mobile node corresponding to the target user identifier;

wherein the transceiver unit is further configured to:

send a query instruction to a user management server, wherein the query instruction comprises the target user identifier, the user management server is configured to manage information about a mobile node and a fixed node that correspond to at least one user identifier, and the at least one user identifier comprises the target user identifier; and receive a communication address list sent by the user management server, wherein the communication address list comprises the communication address of the mobile node corresponding to the target user identifier.

16. The addressing apparatus according to claim 15, wherein, when the addressing apparatus is a fixed node, the transceiver unit is further configured to send a routing information query instruction, wherein the routing information query instruction comprises the target content identifier; or the processing unit is further configured to determine, based on the target content identifier and by using a distributed hash algorithm, information about a fixed node that stores the routing information, and the transceiver unit is further configured to obtain the routing information from the fixed node that stores the routing information.

17. The addressing apparatus according to claim 15, wherein, when the addressing apparatus is a mobile node, the transceiver unit is further configured to:

obtain information about a first fixed node from the user management server, wherein the first fixed node and the addressing apparatus correspond to a same user identifier;

send a routing information query instruction to the first fixed node, wherein the routing information query instruction comprises the target content identifier; and obtain the routing information from the first fixed node.

18. The addressing apparatus according to claim 17, wherein the processing unit is further configured to determine a second fixed node based on the user identifier corresponding to the addressing apparatus, wherein the second fixed node and the addressing apparatus correspond to the same user identifier; and the transceiver unit is further configured to obtain the target content from the second fixed node.

19. The addressing apparatus according to claim 15, wherein the routing information comprises a first content identifier, a first user identifier corresponding to the first content identifier, and a communication address that corresponds to the first content identifier and that is a preset field; and when a content identifier corresponding to newly added stored content comprised in a third fixed node is the first content identifier, and a user identifier corresponding to the third fixed node is the first user identifier, the transceiver unit is further configured to:

obtain updated routing information, wherein the updated routing information is obtained by updating the communication address that corresponds to the first content identifier and that is a preset field to a communication address of the third fixed node, and the third fixed node is any node in the distributed storage network.

20. The addressing apparatus according to claim 15, wherein the transceiver unit is further configured to:

obtain updated routing information, wherein the updated routing information is obtained by updating the routing information with a second content identifier corresponding to newly added stored content of any mobile node and/or a user identifier corresponding to the second content identifier.

21. The addressing apparatus according to claim 15, wherein a quantity of times of updating the communication address of the mobile node is greater than a quantity of times of updating the communication address of the fixed node.

22. An addressing apparatus, comprising:

a memory, configured to store a program; and a processor, configured to execute the program stored in the memory, wherein when executing the program stored in the memory, the processor is configured to perform the addressing method according to claim 1.

23. A non-transitory computer storage medium, wherein the non-transitory computer storage medium stores program code, and the program code comprises instructions for performing the steps in the addressing method according to claim 1.

* * * * *